(12) United States Patent
Parish

(10) Patent No.: X8342
(45) Date of Patent: Aug. 6, 1834

(54) BEE-HIVE & MANAGEMENT OF BEES

(76) Inventor: Levi H. Parish

Levi H. Parish of Brighton, County of Monroe, New York.
Letters Patent,

The Schedule referred to in these Letters Patents and making a part of the same, containing a description in the words of the said Levi H Parish, himself, of his improvement in the construction of Bee hives, and in the management and preservation of Bees.

To all to whom these presents shall come -
Be it Known; that I Levi H Parish of Brighton in the County of Monroe, and State of New York, have invented a new and useful improvement in the construction of Bee Hives, and in the management and preservation of Bees. and that the following is a full and exact description of the construction and operation of the said machine as invented and improved by me -

The hive should be made of boards, of a size, say three feet high, three feet eight inches long, and one foot eight inches deep (standing on legs like a bureau) or any other convenient size to suit the taste of the builder. This should be set in a room in the upper story in a house, or other building with the back side against the wall of the building. In the front side of this Hive should be a door sufficiently large (say two feet high from bottom, by one and a half foot wide) to open and examine the internal concerns of the hive at pleasure. This door should be cased within, and hung with hinges in the ordinary way, with a wooden button or a lock to hold it fast when shut. The cover to the hive also which should be made of a board an inch thick, should be hung with hinges on the back side precisely in the manner of a chest lid; and may have a lock to fasten it in front; if necessary. The cover should project over the hive in front and at the ends sufficiently to receive mouldings underneath. These mouldings, as also the casing inside the door, will be essentially necessary in order to hide the cracks and thereby shut out all destructive insects, and also to exclude the light. Underneath this cover in the top of the hive, are to be four small open boxes, each extending from the front to the back side hive, and sufficiently wide, so as in the aggregate to just fill the top of
hive. They should fit so close as not to admit of the bees passing up
and down around the sides of the boxes, and they should each be
about ten inches deep. They should be placed in an inverted posi-
-tion in the hive, and should rest upon a tier of slats, or narrow strips of
board, extending from end to end of the hive and placed at about
half or three fourths of an inch from each other. About one foot
below these slats, should be placed another tier in like manner as
the first, with the exception that the last may be placed a little wider
apart than those on which the boxes rest. These tiers of slats should
severally rest upon two narrow strips of board nailed or screwed on
to the end boards of the hive, and the slats themselves should all
be fastened in their places by nails or screws. It is intended that
the bees in their accustomed manner of working, shall first fill
the boxes, then work from the slats below down to the second tier of
slats, and from these again down to the bottom of the hive. In the
back side of the hive, should be three apertures, which should extend
through the wall of the house or building, into which these tubes should
be inserted of sufficient length to reach from the inside of the hive to the
outside of the house the ends being cut slanting on the upper side, to
make a lighting place for the bees. These tubes should be placed
in a triangular position, one above and two below. The upper
one should enter the hive just below the upper tier of slats on which
the boxes rest. The entrance through this tube should be four inches
wide, by half an inch deed. The two lower tubes should enter the
hive just below the second tier of slats, and should each be three
inches wide, by half an inch deep, all the tubes should be inclining a
little downward from the inner, to the outward ends, that the water
from without may drop off at the ends, and not run into the hive.
These tubes should be the only places for the Bees to pass into and
out of their hive. In the four boxes above mentioned, there should
be holes cut three inches wide by half an inch deep near the upper
side of the boxes, so that the Bees may pass freely from one box into another, as occasion may require. There should also be three small
apertures cut in the side of the boxes directly over the holes last mentioned
to the top of the boxes three inches long by one fourth of an inch or a little
more in width extending up to the cover of the Hive. These should
be covered by a piece of Millenet laid loosely on the top of the boxes,
to prevent the Bees passing up through them. In the cover of the hive,
should be formed three grooves, extending from the apertures last men-
-tioned, to within about an inch of the back side of the cover. and there
intersecting a mortice leading from thence to the back side of the cover.
This mortice it will be seen must be cut in the edge of the board for-
-ming the cover, and should be three inches long by half an inch
deep, and should be covered on the out side by a piece of fine ~~wire~~
Screen or a piece of millenet sufficiently open to admit a free circu-
-lation of air through it, but not so open as to admit of flies or other
insects to pass in. This, mortice and those grooves, in connection with
the apertures below, are to serve as a draft through which the heated
air in the hive, and the perspiration of the Bees may escape, while
at the same time a constant supply of fresh air from without, is
conveyed in, through the tubes. When a hive of this description is
obtained, the Bees should be hived into one or more of the small boxes
and placed in the hive, or if they are already in a hive of common con-
-struction, by turning it bottom side up, and placing one box at a time
on the top of it they can easily be driven into the boxes and placed
in the hive, where they will immediately go to work. Here they will
remain perfectly secure, and neither disturb the inmates of the house,
or be disturbed by them. Some of the benefits to be derived from the
management of Bees in the manner here recommended may be stated
as follows viz, 1st By Keeping Bees in the house, the owner, or Bee mas-
-ter may excise absolute control over his property, and instead of having
it wrested from his hands improperly, appropriated it to his own use.
2nd The Bees would be secure from the inclemencies of the weather,
neither the scorching ~~rays~~ of a Summers sun, or the chilling win-
-ter winds would affect them: they would also be kept both dry and comfortable, and consequently healthy. 3rd They would be secure from
destroying insects. The hive should be so perfectly tight within the
house, that nothing could molest them: and the tubes being the only
entrance from without, it is believed they will be too high and too
much secluded for insects, especially the Bee moth, that fell destroyer
of the Honey Bee, to enter. 4th They may be carefully examined at all
times, to see if an enemy gets among them, and also how they progress
in their work. 5th They will not be subject to losses by swarming, as
it is well known that bees will never swarm while they have sufficient
room for their operations. If, however, they should become too numer-
=ous at any time to occupy one hive to advantage, they may be divided
in the following manner, viz, Prepare another hive of the same
size and construction, with the one the Bees occupy, place it in the
room where it is to stand, then in a stormy day, or evening when the
bees are all in their hive, take out all the boxes, with all the bees
that may be in them, and place them in the new hive, and put
the boxes belonging to the new hive into the old one at the same
time. This will divide them nearly equal, and if either becomes
too numerous again, divide them again in the same manner (or
connect the two hives by a tube, so that the Bees can pass from one
into the other), remembering always to stop up the tubes of the old
hive for one or two days after dividing a swarm, or until the bees
in the new hive begin to work well in and out at the tubes of
their new habitation: then unstop the tubes and all will work
well. 6th Honey may be taken from them at any time even in
the midst of summer, if the owner wishes a box of fine white
Honey: he has but to take a spare box with him, and take out one
of the boxes, supplying its place with the spare one; then take the
box out of doors and turn it bottom side up, and rap on it until the
Bees all leave it. The Bees will all return to their hive again while
the owner may enjoy in an eminent degree, the fruits of their
industry. 7th The owner should be careful to leave honey suffi-
=cient in the hive for the use of the bees through the winter which he may well afford to do as it is well known that 10 or 12 lb: will winter a swarm of common size even as far north as latitude 42, or 43 degrees. Then in the spring the whole should be taken away, first by clearing the boxes above, and then by cutting the combs from the slats below*. The boxes may be cleared by taking them out of the hive one at a time, turning it bottom side up, and placing an empty box on it, and driving the bees into the empty box, which place in the hive. This may be done in a cool day in the spring without any danger to the one who performs the operation. This is the great desideratum in the art of keeping bees, and with hives of this coustruction you can take from them all the honey they have to spare, and still preserve their valuable lives. 8th Bees work better in a hive that is empty, than in one that is full; and by clearing it out wholy once in the year and partially at other times, they will always have room sufficient for their operations. 9th Honey is far more delicate and more valuable when new, than when it has been a long time in the hive; and by this process we may always have new honey. — 10th Bees kept in this manner would be much less liable to be robbed by other swarms. Being kept in the house, they would be more secluded; other bees would not be so likely to be attracted thither by the smell of honey, and in the course of one or two years they would become so numerous as to be able to repel any invasion of ordinary swarms. 11th By keeping bees in the manner here recommended, they can as well be kept in large towns and cities as in the country, which is not the case when kept in the open air, and on or near the ground. 12th As a matter of profit, it is confidently believed that Bees kept in this manner will pay some hundred per cent more on the capital invested, than any other stock our country will produce, yet instead of producing our own, we import a great quantity of honey every year.

*If this operation is performed full early, & it should be early, before the breeding season commences, otherwise a quantity of eggs or young bees might be destroyed, a little honey

United States Patent

Patent No.: X8342 should be left in one or more of the boxes for the use of the bees, until the spring flowers open.

Witnesses
A. S. Alexander
Henry Grimnels

Levi H. Parish

Exd. HHG.

(2254 words)

(Patented 6th Augt. 1834)